(No Model.)
E. E. GOLD.
STEAM HEATER OR RADIATOR.
No. 379,952. Patented Mar. 27, 1888.
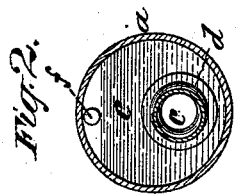
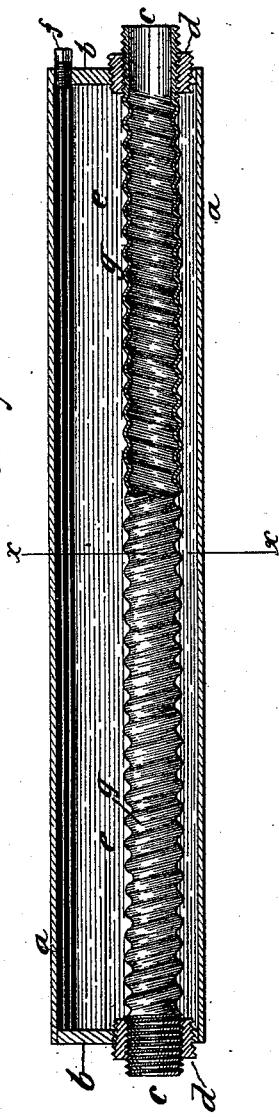
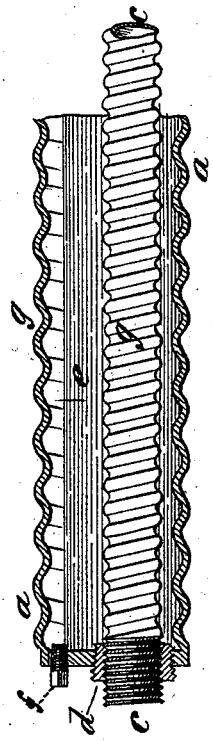
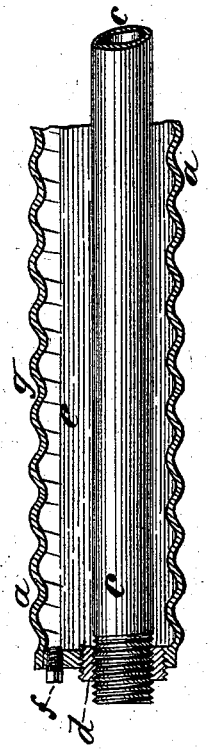
WITNESSES
John Becker.
Jno. E. Gavin.
INVENTOR.
Edward E. Gold,
by Chas. N. Higgins.
Attorney.
N. PETERS, Photo-Lithographer, Washington, D. C.

UNITED STATES PATENT OFFICE.

EDWARD E. GOLD, OF NEW YORK, N. Y.

STEAM HEATER OR RADIATOR.

SPECIFICATION forming part of Letters Patent No. 379,952, dated March 27, 1888.

Application filed September 15, 1886. Serial No. 213,592. (No model.)

*To all whom it may concern:*

Be it known that I, EDWARD E. GOLD, of New York city, county and State of New York, have invented certain new and useful Improvements in Steam Heaters or Radiators, of which the following is a specification.

My invention applies to that class of heaters in which the heat of the steam is first applied to a confined mass of water inclosed in a sealed tube or vessel, which becomes an absorber and reservoir of the heat and continues to radiate the absorbed heat through the outer vessel for some time after the steam has been shut off from the inner tube. In my Patent No. 253,693, of February 14, 1882, I show a compound vessel cast in one piece, with a dividing-partition forming spaces for steam and water, while in my later patent of December 16, 1884, No. 309,299, I show two distinct tubes, one within the other, the inner one being charged with water and sealed and placed within the outer tube, while steam is admitted in the space between the two tubes. In this latter form of heater no difficulty whatever exists as to the expansions and contractions of the two tubes as they become heated and cooled, for the reason that the inner tube is entirely disconnected from the outer tube, and both are therefore free to expand independently. In another class of heaters heretofore made, however, the inner steam-tube, made of plain straight tubing, has been fixed at each end in the heads of the outer tube, water being sealed in the space between the two tubes. In this form of heater the great changes of temperature experienced by the inner tube when heated and cooled produce such frequent expansions and contractions as cause the pipe to bow or bend constantly back and forth, and thus subject the fixed ends to such strains as eventually cause the joints to become defective and the pipe to crack and break off at its connections with the heads of the outer pipe. Now it is to this class of heaters that my present improvement applies; and it consists, in brief, in the combination, with the outer inclosing-tube and a sealed mass of water confined therein, of an inner steam-conveying tube transversely corrugated along its length, threaded at each end, and projecting through openings in the heads of the outer tube, with screw-bushings screwing over the threaded ends of the tube into the heads of the outer tube, whereby I produce a very simple and effective heater of this class, in which the inner steam-tube is securely affixed in the outer tube, yet is free to expand and contract by changes in temperature without injury, as hereinafter fully set forth.

In the drawings annexed, Figure 1 presents a longitudinal section of my improved heater in its preferred form, and Fig. 2 is a cross-section thereof on line $x\,x$. Figs. 3 and 4 are fragmentary longitudinal sections of modifications or variations of my invention.

My improved heater, as shown in the drawings, is preferably made in a narrow elongated tubular or cylindrical form, and is placed in a recumbent or horizontal position, and is thus specially designed for heating cars, greenhouses, waiting-rooms, work-shops, and other places where it can be conveniently placed under seats or benches; but it of course may be made in higher and broader shapes and used for many other purposes.

In Figs. 1 and 2 $a$ indicates the outer inclosing tube or chamber of the heater, which is preferably made of a section of ordinary wrought-iron tube about four inches in diameter and of convenient length, in each end of which are welded the iron heads $b\,b$, which close the ends of the tube. Longitudinally within the outer tube is arranged the inner steam-tube, $c$, preferably made of brass or copper, and of about one inch in diameter, and preferably placed in an eccentric position, or near the bottom of the outer pipe, as shown. Each end of the tube $c$ projects through the heads $b$, and is left open at each end and screw-threaded for connection to the steam-supply pipes, or with couplings which will couple the steam-pipe of one heater to the pipe of the next when a number of heaters are arranged in series. Each threaded end of the steam-pipe $c$ is secured in the heads $b$ by the taper bushings $d\,d$, which screw onto the ends of said pipe and into taper screw-holes in the heads $b\,b$, as fully shown in Fig. 1, thus making a steam-tight joint in a simple and effective manner. The space between the two tubes is filled or nearly filled with a mass of salted water, $e$, or other absorbent of heat, water being of course the best. The water may be filled in through a hole in one of the heads, which is afterward closed by the screw-plug $f$, thus hermetically sealing the contents of the tube therein, sufficient air-space being left, as usual, for expansion, as shown in Figs. 1 and 2. Now the inner tube, c, instead of being straight or plain, as heretofore, is transversely corrugated, as shown at g, preferably in the form of a continuous screw-thread of coarse rounded form, as well shown in Fig. 1. The effect of this corrugation is not only to greatly increase the heating-surface of the tube, but it renders it longitudinally elastic, as the corrugations allow a springy or bellows-like action, which allows the tube to expand or contract freely to any possible extent by the extremes of temperature without tending to bow or bend the tube or strain it at its connections at each end; hence when steam is admitted to the inner corrugated tube it will rapidly heat the tube and the water surrounding it, which will soon become heated to the temperature of the steam, or nearly so, and in so doing will absorb a very great quantity of heat, water having, as is well known, the greatest capacity for heat, and this heat will be thus stored up in the water after the steam is shut off, and will continue to be radiated from the outer vessel for a long time afterward, thus forming a most desirable form of heater, particularly for railway-cars, in which the steam requires to be applied only at each end of the route, in case of horse-cars, or at intervals during the trip, in the case of entrained steam-cars. As the heat is applied to the bottom of the mass of water, it will become heated much more rapidly than if applied at the middle or near the top.

Owing to the great longitudinal elasticity of the corrugated tube allowing the spring or bellows-like action mentioned, no bending or bowing of the tube occurs between the extremes of heating and cooling, and hence the joints at the ends of the tube do not become loosened or defective, and the tube is not subjected to injurious strains at its fixed ends, and does not crack or break, but remains permanent and durable, which advantage, together with the large heating-surface of the tube and the effective manner in which the heat is applied to the confined mass of water, renders my invention an important improvement in this type of heaters.

In some cases both the outer and inner tubes may be corrugated, as shown in Fig. 3, but it is only necessary that either one or the other be so corrugated, and hence in some cases the inner tube may be plain, and the outer tube corrugated, as seen in Fig. 4, which will produce about the same result; but it is of course preferable to have the inner tube corrugated and the outer plain, as seen in Figs. 1 and 2.

What I claim is—

The combination of the tube a, having closed ends or heads b, and the confined mass of liquid e, with the inner corrugated heating-tube, c, and screw bushings d d, securing the ends thereof in the heads b, arranged and operating substantially as shown and described.

EDWARD E. GOLD.

Witnesses:
JNO. E. GAVIN,
CHAS. M. HIGGINS.